(12) United States Patent
Kang et al.

(10) Patent No.: US 9,178,595 B2
(45) Date of Patent: Nov. 3, 2015

(54) METHOD FOR INDICATING PRECODING MATRIX INDICATOR IN UPLINK MIMO SYSTEM WITH BASED ON SC-FDMA

(75) Inventors: Byeong Woo Kang, Anyang-si (KR); Joon Kui Ahn, Anyang-si (KR); Dong Youn Seo, Anyang-si (KR); Jung Hoon Lee, Anyang-si (KR); Yu Jin Noh, Anyang-si (KR); Byoung Hoon Kim, Anyang-si (KR); Suck Chel Yang, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 13/148,886

(22) PCT Filed: Feb. 19, 2010

(86) PCT No.: PCT/KR2010/001039
§ 371 (c)(1),
(2), (4) Date: Nov. 14, 2011

(87) PCT Pub. No.: WO2010/095884
PCT Pub. Date: Aug. 26, 2010

(65) Prior Publication Data
US 2012/0082102 A1    Apr. 5, 2012

Related U.S. Application Data

(60) Provisional application No. 61/161,049, filed on Mar. 17, 2009, provisional application No. 61/157,206, filed on Mar. 4, 2009, provisional application No. 61/153,974, filed on Feb. 20, 2009.

(30) Foreign Application Priority Data

Jul. 7, 2009    (KR) .................. 10-2009-0061699

(51) Int. Cl.
H04B 7/216    (2006.01)
H04B 7/06     (2006.01)
H04L 5/00     (2006.01)

(52) U.S. Cl.
CPC ............ H04B 7/0639 (2013.01); H04L 5/0039 (2013.01)

(58) Field of Classification Search
None
See application file for complete search history.

(56) References Cited

U.S. PATENT DOCUMENTS 8,699,314 B2 * 4/2014 Kim et al. ............ 370/203
2009/0052405 A1 * 2/2009 Ko et al. ............... 370/335
(Continued)

FOREIGN PATENT DOCUMENTS

KR    10-2008-0070151 A    7/2008
KR    10-2008-0086333 A    9/2008
(Continued)

OTHER PUBLICATIONS

Nortel, "Further Discussion on DL/UL Signaling Channel Supporting Rank Adaptation for High Mobility UE," 3GPP TSG-RAN 1 Meeting #50-bis, R1-073962, Shanghai, China, Oct. 8-12, 2007, pp. 1-4.
(Continued)

*Primary Examiner* — Marsha D Banks Harold
*Assistant Examiner* — Christopher Wyllie
(74) *Attorney, Agent, or Firm* — Birch, Stewart, Kolasch & Birch, LLP

(57) ABSTRACT

A method of transmitting PMI (precoding matrix indicator) information in an uplink MIMO system is disclosed. The present invention includes the steps of receiving channel information from a user equipment and transmitting information on a resource allocated to the user equipment in uplink transmission and PMI information indicating a precoding matrix to apply to a region of the resource among a plurality of precoding matrices to the user equipment based on the received channel information, wherein the resource allocated to the user equipment is allocated by a bundle unit of a prescribed number of subcarriers, wherein each of a plurality of the precoding matrices are applied to regions generated from dividing a whole frequency band into a prescribed number of regions, respectively, and wherein the precoding matrix applied to the resource among a plurality of the precoding matrices has a maximum area resulting from overlapping a frequency band occupied by the allocated resource with a frequency band having the precoding matrix applied thereto.

4 Claims, 11 Drawing Sheets

(56) References Cited

U.S. PATENT DOCUMENTS

| | | | |
|---|---|---|---|
| 2009/0059844 A1* | 3/2009 | Ko et al. | 370/328 |
| 2009/0109917 A1* | 4/2009 | Pajukoski et al. | 370/329 |
| 2009/0262695 A1* | 10/2009 | Chen et al. | 370/329 |
| 2009/0303938 A1* | 12/2009 | Kim et al. | 370/329 |
| 2009/0323840 A1 | 12/2009 | Lee et al. | |
| 2010/0074316 A1* | 3/2010 | Kim et al. | 375/228 |
| 2010/0183086 A1* | 7/2010 | Ko et al. | 375/260 |
| 2010/0195594 A1* | 8/2010 | Seo et al. | 370/329 |
| 2010/0329220 A1* | 12/2010 | Kim et al. | 370/336 |
| 2011/0096658 A1* | 4/2011 | Yang et al. | 370/210 |
| 2011/0194520 A1* | 8/2011 | Akimoto et al. | 370/329 |
| 2011/0222629 A1* | 9/2011 | Lindh et al. | 375/296 |
| 2011/0235620 A1* | 9/2011 | Ahn et al. | 370/336 |
| 2011/0243026 A1* | 10/2011 | Kim et al. | 370/252 |
| 2012/0063438 A1* | 3/2012 | Kang et al. | 370/338 |
| 2012/0113794 A1* | 5/2012 | Roman et al. | 370/201 |
| 2014/0177572 A1* | 6/2014 | Papasakellariou et al. | 370/329 |

FOREIGN PATENT DOCUMENTS

| | | |
|---|---|---|
| KR | 10-2008-0095732 A | 10/2008 |
| KR | 10-2009-0017973 A | 2/2009 |

OTHER PUBLICATIONS

NTT Docomo et al., "Investigation on PMI Indication Schemes for Single-User MIMO Precoding in E-UTRA Downlink," 3GPP TSG RAN WG1 Meeting #52, R1-081037, Sorrento, Italy, Feb. 11-15, 2008, pp. 1-8.

Panasonic, "Views on UL MIMO Extension up to 4x4," 3GPP TSG RAN WG1 Meeting #56, R1-090688, Athens, Greece, Feb. 9-13, 2009, 4 pages.

* cited by examiner

METHOD FOR INDICATING PRECODING MATRIX INDICATOR IN UPLINK MIMO SYSTEM WITH BASED ON SC-FDMA

CROSS REFERENCE TO RELATED APPLICATIONS

This application is the National Phase of PCT/KR2010/001039 filed on Feb. 19, 2010, which claims priority under 35 U.S.C. 119(e) to U.S. Provisional Application No. 61/153,974 filed on Feb. 20, 2009, U.S. Provisional Application No. 61/157,206 filed on Mar. 4, 2009, U.S. Provisional Application No. 61/161,049 filed on Mar. 17, 2009 and under 35 U.S.C. 119(a) to Patent Application No. 10-2009-0061699 filed in the Republic of Korea on Jul. 7, 2009, all of which are hereby expressly incorporated by reference into the present application.

TECHNICAL FIELD

The present invention relates to a wireless mobile communication technology, and more particularly, to a method of transmitting PMI (precoding matrix indicator) in SC-FDMA based uplink MIMO system.

BACKGROUND ART

Generally, in a mobile communication system, a user equipment is able to receive information in downlink from a base station. And, the user equipment is able to transmit information in uplink as well. The information transmitted or received by the user equipment includes data and various kinds of control information. And, various physical channels exist according to a type usage of the information transmitted or received by the user equipment.

FIG. 1 is a diagram for explaining physical channels used for such a mobile communication system as 3GPP ($3^{rd}$ generation partnership project) LTE (long term evolution) system and a general signal transmitting method using the physical channels.

Referring to FIG. 1, in a step S101, a user equipment, of which turned-off power is turned on again or which enters a new cell, performs an initial cell search for matching synchronization with a base station or the like. For this, the user equipment matches the synchronization with the base station by receiving a primary synchronization channel (P-SCH) and a secondary synchronization channel (S-SCH) from the base station and then obtains such information as cell ID and the like. Subsequently, the user equipment is able to obtain intra-cell broadcast information by receiving a physical broadcast channel from the base station. Meanwhile, the user equipment is able to check a downlink channel status by receiving a downlink reference signal (DL RS) in the initial cell searching step.

Having completed the initial cell search, the user equipment is able to obtain further detailed system information by receiving a physical downlink control channel (PDCCH) and a physical downlink shared channel (PDSCH) according to the physical downlink control channel information.

Meanwhile, the user equipment failing to complete the access to the base station is able to perform such a random access procedure as the steps S103 to S106 to complete the access to the base station. For this, the user equipment transmits a feature sequence as a preamble via a physical random access channel (PRACH) [S103] and is then able receive a response message in response to the random access via a physical downlink control channel and a physical downlink shared channel corresponding to the physical downlink control channel [S104]. Subsequently, in case of a contention based random access except a case of handover, it is able to perform such a contention resolution procedure as a transmission of an additional physical random access channel [S105] and a reception of a physical downlink control channel and a physical downlink shared channel corresponding to the physical downlink control channel [S106].

Having performed the above procedures, the user equipment is able to perform general uplink/downlink signal transmitting procedures including a physical downlink control channel/physical downlink shared channel reception [S107] and a physical uplink shared channel/physical uplink control channel (PUSCH/PUCCH) transmission [S108].

FIG. 2 is a diagram for explaining a signal processing method for transmitting an uplink (UL) signal from a user equipment.

Referring to FIG. 2, in order to transmit a UL signal, a scrambling module 201 of a user equipment is able to scramble a transmission signal using a user equipment specific scrambling signal. This scrambled signal is inputted to a modulation buffer 202 to be modulated into a complex symbol by BPSK, QPSK or 16 QAM according to a type of the transmission signal and/or a channel status. Subsequently, the modulated complex symbol is processed by a transform precoder 203 and is then inputted to a resource element mapper 204. The resource element mapper 204 is able to map the complex symbol to a time-frequency resource element that will be used for real transmission. This processed signal enters a SC-FDMA signal generator 205 and is then transmitted to a base station via an antenna.

FIG. 3 is a diagram for explaining a signal processing method for transmitting a downlink (DL) signal from a base station.

Referring to FIG. 3, in 3GPP LTE system, a base station is able to transmit at least one or more code words in DL. Therefore, each of the at least one or more code words can be processed into a complex symbol through a scrambling module 301 and a modulation mapper 302 like the UL case shown in FIG. 2. Subsequently, the complex symbol is mapped to a plurality of layers by a layer mapper 303. Each of the layers can be assigned to each transmitting antenna by being multiplied by a prescribed precoding matrix selected according to a channel status by a precoding module 304. This processed transmission signal per antenna is mapped to a time-frequency resource element that will be used for transmission by a resource element mapper 305, is inputted to an OFDMA signal generator 306, and is then transmitted via a corresponding antenna.

FIG. 4 is a diagram for explaining SC-FDMA for UL signal transmission and OFDMA for DL signal transmission in a mobile communication system.

Referring to FIG. 4, a user equipment for UL signal transmission and a user equipment for DL signal transmission are identical to each other in including a serial-to-parallel converter 401, a subcarrier mapper 403, an M-point IDFT module 404 and a CP (cyclic prefix) adding module 406.

However, the user equipment for transmitting a signal by SC-FDMA further includes a parallel-to-serial converter 405 and an N-point DFT module 402. In this case, the N-point DFT module 402 is characterized in enabling a transmission signal to have a single carrier characteristic by partially canceling out IDFT processing influence of the M-point IDFT module 404.

MIMO is the abbreviation of multiple-input multiple-output. By doing away with using one transmitting antenna and one receiving antenna, the MIMO is the method of raising transceived data efficiency using multiple transmitting antennas and multiple receiving antennas. In particular, according to the MIMO technology, a transmitting or receiving side of a wireless communication system uses multiple antennas to increase capacity or enhance performance.

In order to receive one whole message, the MIMO technology applies a technique of completing the received whole message by gathering data fragments received via plural antennas together without depending on a signal antenna path. Since the MIMO technology is able to enhance a data transmit speed (data rate) within a specific range or is able to extend a system range for a specific data transmit speed, it is the next generation mobile communication technology widely usable for a mobile communication terminal, a real and the like. Many attentions are paid to this technology to overcome the traffic overcome of mobile communication that reaches a critical situation due to data communication expansion and the like.

FIG. 5 is a block diagram of a general MIMO communication system.

Referring to FIG. 5, if the number of transmitting antennas and the number of receiving antennas are simultaneously incremented into $N_T$ and $N_R$, respectively, channel transmission capacity is theoretically increased in proportion to the number of antennas unlike the case that either a transmitter or receiver uses plural antennas. Therefore, it is possible to raise a data rate and to dramatically enhance frequency efficiency. The data rate according to the increase of the channel transmission capacity can be theoretically raised by an amount resulting from multiplying a maximum data rate $R_0$ of the case of using one antenna by an increase rate $R_i$ of Math FIG. 1.

MathFigure 1

$$R_i = \min(N_T, N_R) \quad [\text{Math.1}]$$

For instance, in MIMO communication system using 4 transmitting antennas and 4 receiving antennas, it is able to obtain a data rate 4 times greater than that of a single antenna system theoretically. After the theoretical capacity increase of the multiple antenna system has been proved in the mid-90s, many efforts are ongoing to be made to research and develop various technologies to realize the substantial enhancement of data rate. And, standards of the 3rd generation mobile communication and various wireless communications have already reflected some of these technologies.

Looking into the current MIMO relevant study tendency so far, many efforts are ongoing to be made to the information theory study relevant to MIMO communication capacity calculation in various channel configurations and multiple access environments, radio channel measurement and modeling study in MIMO communication system, spatiotemporal signal processing technology study for transmission reliability and data rate enhancements and the like in various aspects.

The MIMO technology can apply to spatial multiplexing scheme, antenna diversity scheme and the like.

First of all, the spatial multiplexing is the scheme of transmitting different signal series via transmitting antennas, respectively. In this case, signals respectively transmitted via the transmitting antennas are received in a manner of being overlapped with each other. A receiver then separates the overlapped signals by ML (maximum likelihood) scheme, BLAST (Bell labs layered space-time) scheme, ZF (zero forcing) scheme, MMSE (minimum mean square error) scheme or the like. Moreover, in case that channel information is already known, it is able to transmit a signal in a manner of forming orthogonal beam by giving an appropriate weight to each transmitting antenna using the channel information. By this method, it is able to increase data transmit capacity using the spatial multiplexing.

Secondly, the antenna diversity is the scheme of transmitting or receiving one signal series via multiple antennas. In such manner, it is able to raise SNR (signal-to-noise power ratio). If a channel status is unstable, the antenna diversity is useful to cope with fading to enhance error rate performance.

DISCLOSURE OF INVENTION

Technical Problem

SC-FDMA maps a frequency domain signal generated by DFT over broadband. In case of applying the SC-FDMA to the MIMO technology, if a whole band is precoded by one precoding matrix in spite that channel configuration differs according to a subcarrier, error rate performance, throughput performance and the like are degraded. On the contrary, if precoding is performed on a whole band per subcarrier using different precoding matrix, an information size, which should be fed back by a receiver, is increased. Therefore, in case of applying the SC-FDMA to the MIMO technology, the demand for how to perform precoding on an allocated resource to optimize a system is rising.

Solution to Problem

Accordingly, the present invention is directed to a method of transmitting PMI (Precoding Matrix Indicator) in SC-FDMA based uplink MIMO system that substantially obviates one or more of the problems due to limitations and disadvantages of the related art.

An object of the present invention is to provide a method of transmitting PMI (Precoding Matrix Indicator) information, which will be applied to a resource allocated to a user equipment, in SC-FDMA based uplink MIMO system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting PMI (Precoding Matrix Indicator) information in an uplink MIMO system according to the present invention includes the steps of receiving channel information from a user equipment and transmitting information on a resource allocated to the user equipment in uplink transmission and PMI information indicating a precoding matrix to apply to a region of the resource among a plurality of precoding matrices to the user equipment based on the received channel information, wherein the resource allocated to the user equipment is allocated by a bundle unit of a prescribed number of subcarriers, wherein each of a plurality of the precoding matrices are applied to regions generated from dividing a whole frequency band into a prescribed number of regions, respectively, and wherein the precoding matrix applied to the resource among a plurality of the precoding matrices has a maximum area resulting from overlapping a frequency band occupied by the allocated resource with a frequency band having the precoding matrix applied thereto.

To further achieve these and other advantages and in accordance with the purpose of the present invention, a method of transmitting PMI (Precoding Matrix Indicator) information in an uplink MIMO system includes the steps of receiving channel information from a user equipment and transmitting information on a resource allocated to the user equipment in uplink transmission and PMI information indicating a precoding matrix to apply to a region of the resource among a plurality of precoding matrices to the user equipment based on the received channel information, wherein the resource allocated to the user equipment is allocated by a bundle unit of a prescribed number of subcarriers, wherein each of a plurality of the precoding matrices are applied to regions generated from dividing a whole frequency band into a prescribed number of regions, respectively, and wherein the precoding matrix applied to the resource among a plurality of the precoding matrices has a minimum area resulting from overlapping a frequency band occupied by the allocated resource with a frequency band having the precoding matrix applied thereto.

Preferably, the PMI information is carried on PDCCH (Physical Downlink Control Channel) together with an uplink scheduling grant.

Preferably, the PMI information is transmitted by upper layer signaling.

More preferably, the upper layer signaling includes RRC (Radio Resource Control) signaling. Preferably, the PMI information is carried on PDCCH using DCI (Downlink Control Information) format.

Preferably, one part of the PMI information and the rest of the PMI information are simultaneously transmitted to the user equipment via PDCCH and PDSCH, respectively.

It is to be understood that both the foregoing general description and the following detailed description are exemplary and explanatory and are intended to provide further explanation of the invention as claimed.

Advantageous Effects of Invention

According to embodiments of the present invention, even if a frequency band, to which a precoding matrix is applied, fails to match a frequency band of an allocated resource, the present invention enables a system to operate correctly, thereby securing stability of system.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

The present invention considers spatial multiplexing among MIMO transmission schemes. A base station performs transmission signal processing on data to transmit and then transmits the processed signal via plural antennas. According to the present invention, the transmission signal processing uses layer mapping and a precoding matrix. And, the number of layers to be transmitted and a precoding matrix to be used by a user equipment are indicated by a base station. Yet, assume that the base station obtains a channel status and selects the number of the transmittable layers and the precoding matrix based on the corresponding channel information.

Moreover, the present invention considers a system in which uplink (UL) SC-FDMA is applied to the MIMO technology.

Figure 1:
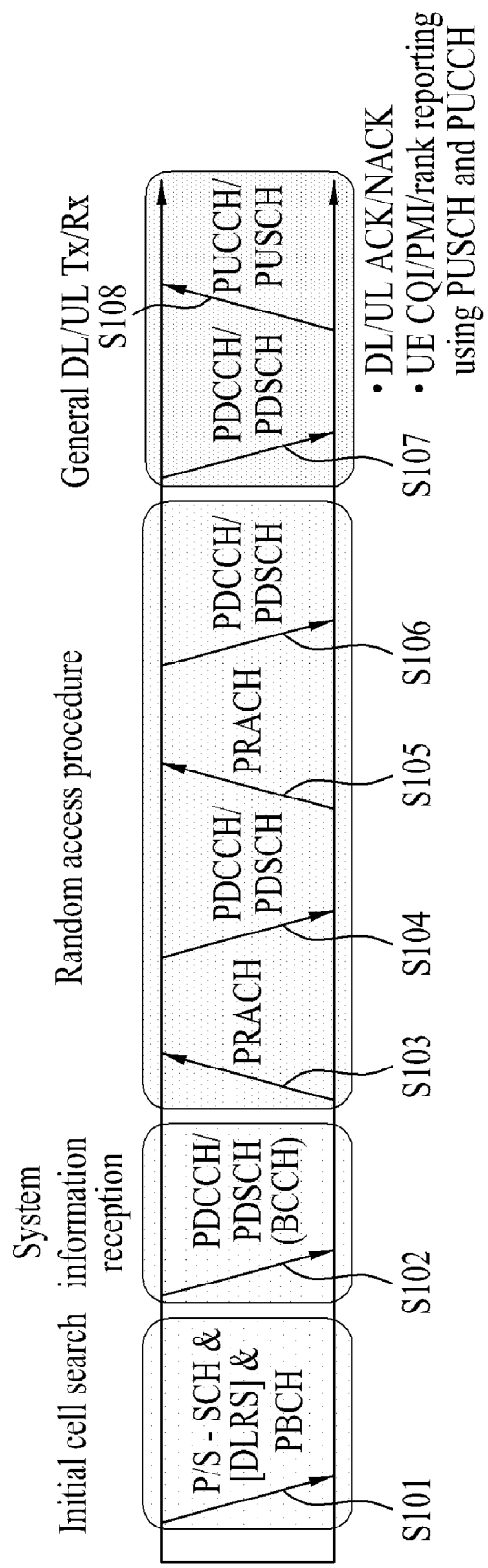
FIG. 1 is a diagram for explaining physical channels used for such a mobile communication system as 3GPP ($3^{rd}$ generation partnership project) LTE (long term evolution) system and a general signal transmitting method using the physical channels.
Figure 2:
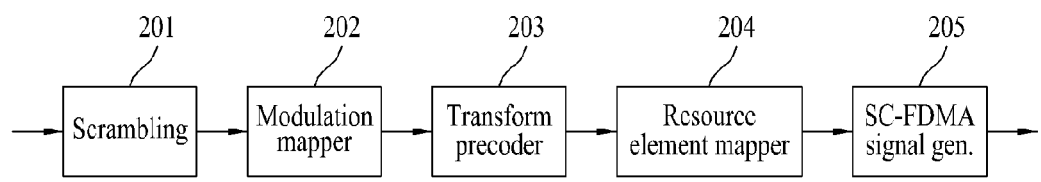
FIG. 2 is a diagram for explaining a signal processing method for transmitting an uplink (UL) signal from a user equipment.
Figure 3:
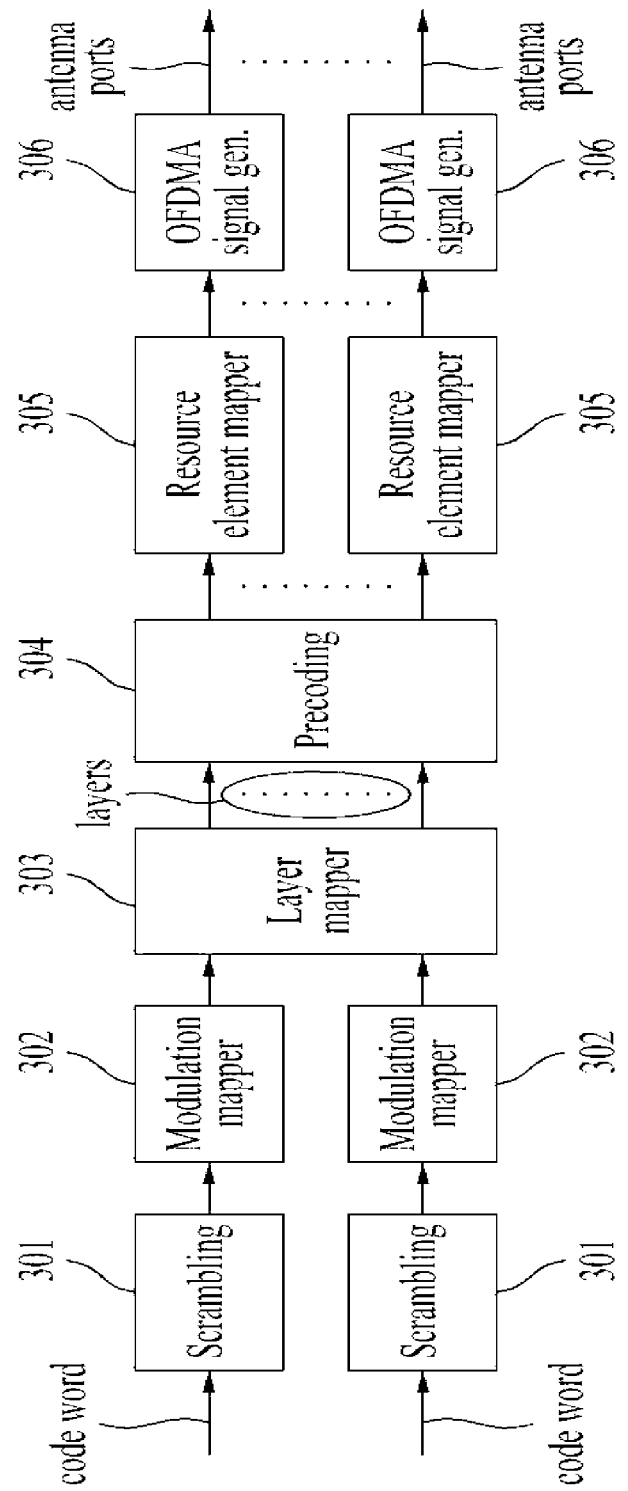
FIG. 3 is a diagram for explaining a signal processing method for transmitting a downlink (DL) signal from a base station.
Figure 4:
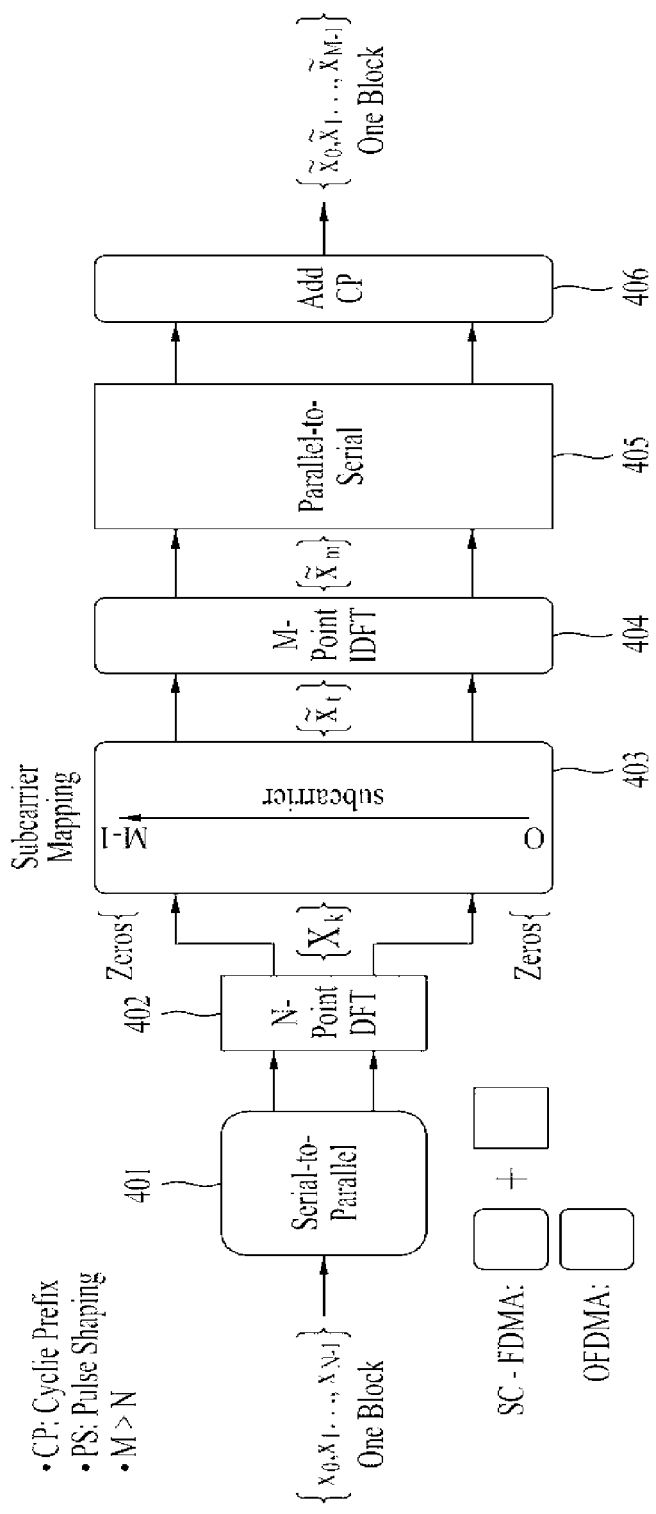
FIG. 4 is a diagram for explaining SC-FDMA for UL signal transmission and OFDMA for DL signal transmission in a mobile communication system.
Figure 5:
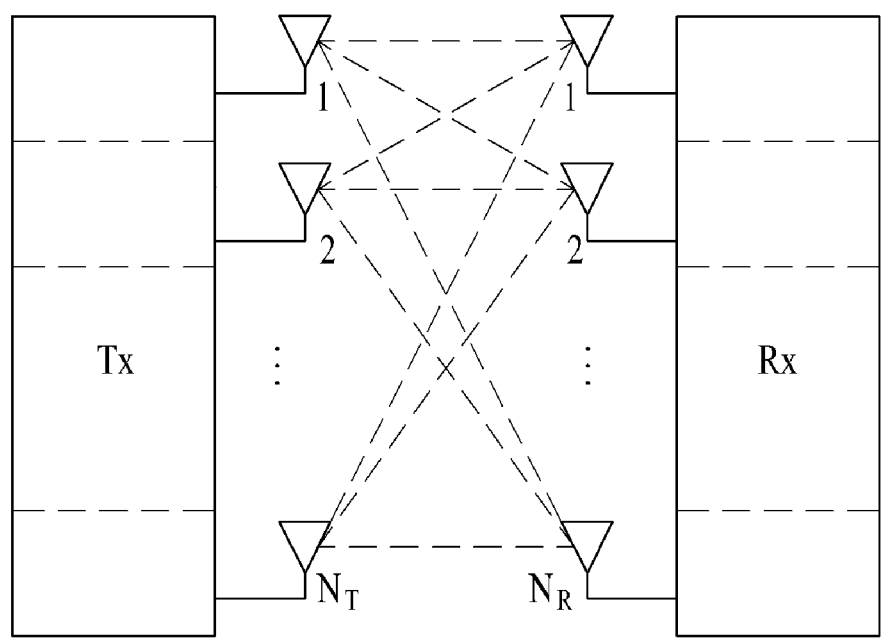
FIG. 5 is a block diagram of a general MIMO communication system.
Figure 6:
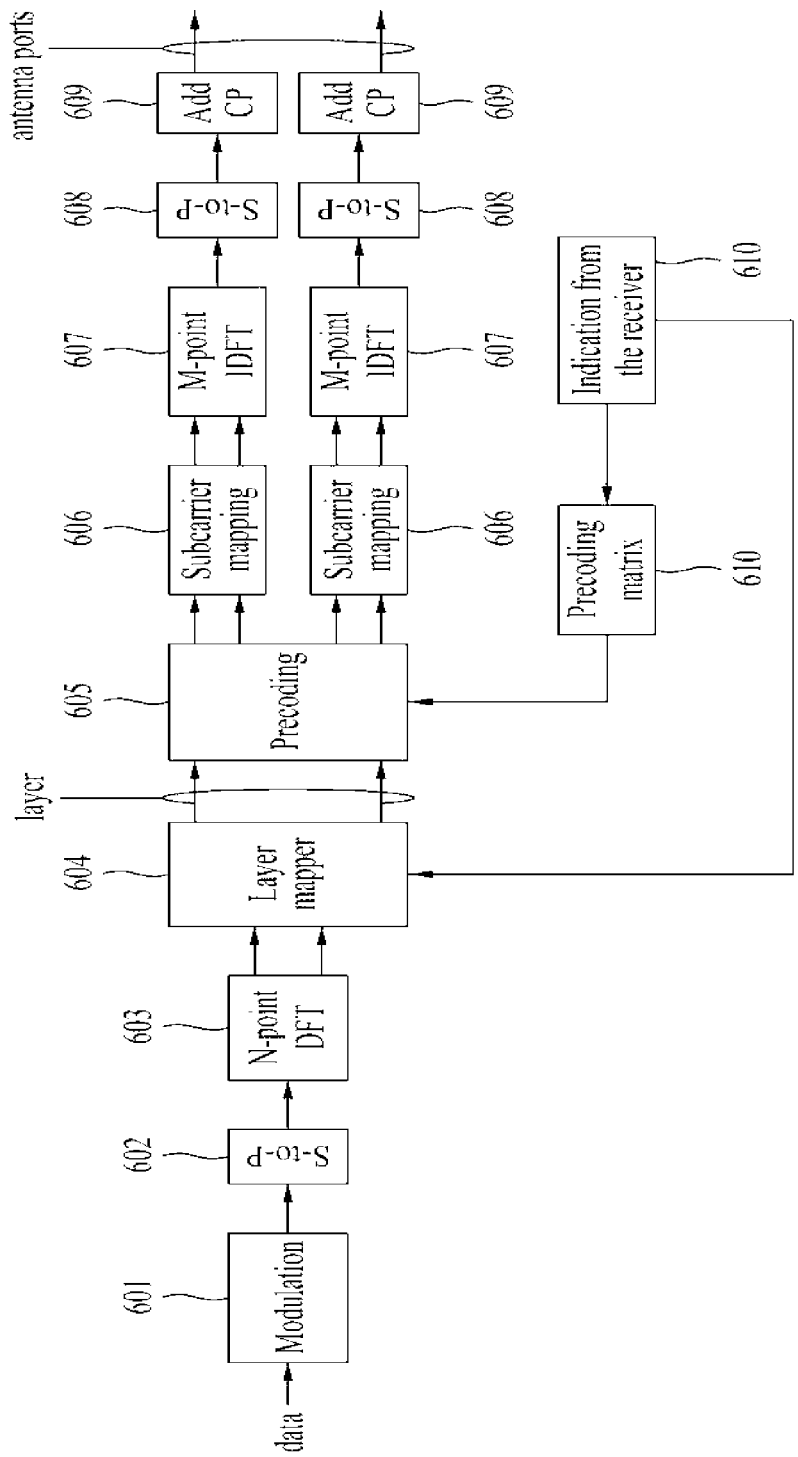
FIG. 6 is a block diagram for a structure of a system having SC-FDMA applied to MIMO technology.

FIG. 6 is a block diagram for a structure of a system having SC-FDMA applied to MIMO technology.

Referring to FIG. 6, if UL SC-FDMA is applied to MIMO technology, a layer mapping process and a precoding process are added to an SC-FDMA system.

First of all, a user equipment generates a symbol by modulating data to be transmitted (601). The user equipment converts the symbol by serial to parallel conversion (602), obtains a frequency domain symbol by performing N-point DFT on the serial-to-parallel converted symbol (603), and then performing layer mapping and precoding on each frequency-domain symbol (604, 605). In doing so, a precoding matrix (610) used for precoding is determined by being indicated by a base station (610). Subsequently, the user equipment performs subcarrier mapping and IDFT by antenna unit (607). In this case, a DFT interval and an IDFT interval may differ from each other. After completion of the IDFT, the user equipment performs parallel to serial conversion (608), attaches a cyclic prefix (CP) to the corresponding signal, and then transmits the CP attached signal (609). Assume that the base station obtains information on a channel with a predetermined interval. And, assume that the base station notifies the number of transmission layers and the precoding matrix, which will be used by the user equipment, to the user equipment.

Figure 7:
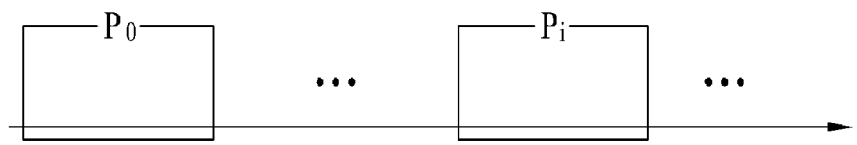
FIG. 7 is a conceptional diagram of arrangement of a precoding matrix according to the present invention.

FIG. 7 is a conceptional diagram of arrangement of a precoding matrix according to the present invention.

Referring to FIG. 7, assume that a precoding matrix to be used is defined according to a position of a subcarrier in a frequency domain.

A resource unit, to which one PMI (precoding matrix indicator) is applied, can include a subcarrier, a subband or a cluster. In this case, the subband is constructed with a plurality of consecutive subcarriers that occupy regions generated from dividing a whole band into equal parts. Although the cluster is constructed with a plurality of consecutive subcarriers, it is scheduled by a base station. And, at least one or more clusters are allocated via a UL grant signal for UL transmission of a user equipment. If one of a plurality of precoding matrices respectively predetermined for regions generated from dividing a whole band into a prescribed number of bands is applied to a cluster corresponding to this precoding matrix, it is more advantageous in performance such as an error rate, throughput and the like rather than applying one equal precoding matrix across a whole band.

In this case, the UL grant signal (UL scheduling information of base station) for cluster allocation to each user equipment follows DCI (Downlink Control Information) carried on PDCCH (Physical Downlink Control Channel). The user equipment receives the PDCCH from the base station and then decodes the DCI within the PDCCH. And, each user equipment obtains a location of a resource and a PMI value of each cluster allocated by the base station. Particularly, if a size of the DCI is changed according to a UL scheduling result of a base station or is not notified to a user equipment in advance, the corresponding user equipment performs blind detection of a valid size of the DCI for the PDCCH transmitted by the base station.

In UL SC-FDMA transmission, a frequency domain signal obtained after completion of DFT is transmitted across a broadband. A channel of the broadband has property of frequency selectivity by high speed communication. In a system having UL SC-FDMA applied to MIMO technology, if one precoding matrix is used across a whole band only, performance of the system is degraded.

On the contrary, if precoding is performed per subcarrier, a size of feedback information, which should be sent to a user equipment by a base station, is raised. Therefore, the per-subcarrier precoding is not preferable. Accordingly, the present invention proposes that a base station allocates a resource to a user equipment by a bundle unit of a prescribed number of subcarriers. And, the present invention proposes that a whole band is divided into a prescribed number of regions and that a separate precoding matrix shall be applied to each of the regions.

Meanwhile, frequency domain symbols obtained by a user equipment after completion of N-point DFT are separated by cluster unit and then receives frequency allocation thereto. A frequency band occupied by a cluster can be defined different from a frequency band to which a precoding matrix is applied. Due to this reason, if a cluster is located across a frequency band to which plural precoding matrices are applied, a system needs to predetermine which precoding matrix shall be applied to the corresponding cluster. If this is not predetermined, it may cause a problem that a system having SC-FDMA applied to MIMO technology may not operate correctly.

First Embodiment

Figure 8:
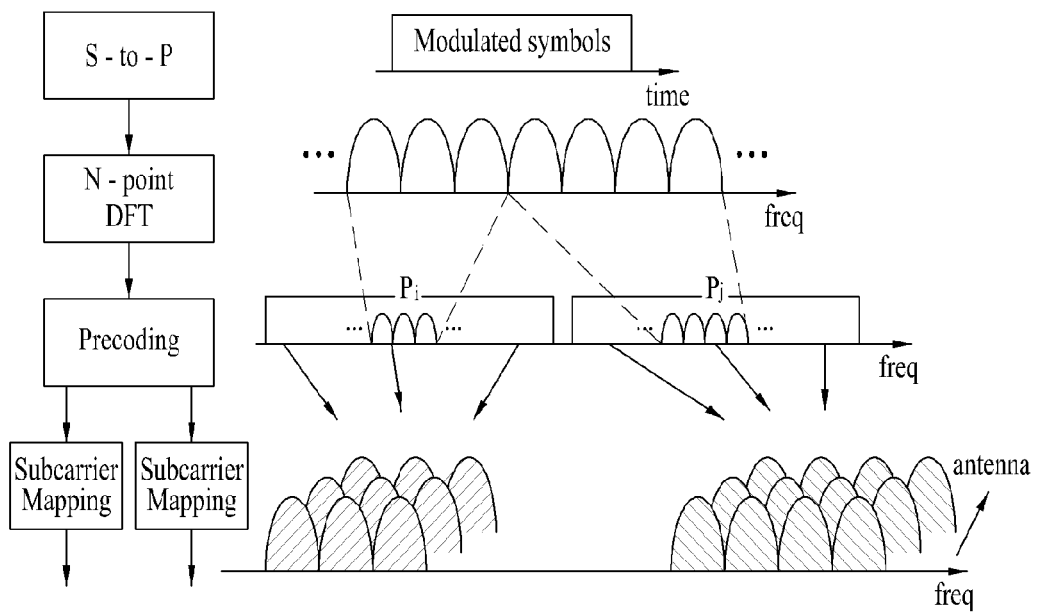
FIG. 8 is a diagram for explaining a method of applying precoding in uplink signal transmission according to one embodiment of the present invention.

FIG. 8 is a diagram for explaining a method of applying precoding in uplink signal transmission according to one embodiment of the present invention.

Referring to FIG. 8, a base station obtains information on a channel with a predetermined interval. The base station calculates information (i.e., the number of subcarrier blocks and a precoding matrix) necessary for a user equipment based on the obtained channel information and then informs the user equipment of the calculated information.

Frequency domain symbols, which are obtained from performing DFT on symbols serial-to-parallel converted by the user equipment, are separated by a unit of a prescribed number clusters and then receive frequency allocation thereto. The base station divides the symbols in the frequency domain by the unit of a prescribed number of clusters based on the channel information and then notifies it to the user equipment. In doing so, the base station sends information on a precoding matrix, which will be used for each subcarrier interval (e.g., subband), to the user equipment as well. The user equipment performs precoding on the corresponding cluster using the notified precoding matrix.

Figure 9:
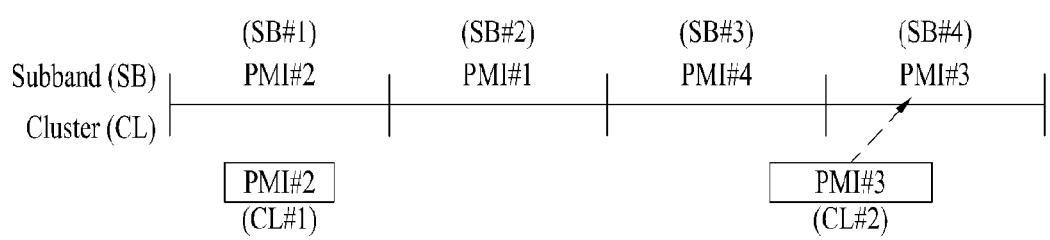
FIG. 9 is a diagram for explaining a method of applying precoding in uplink signal transmission according to one embodiment of the present invention.

FIG. 9 is a diagram for explaining a method of applying precoding in uplink signal transmission according to one embodiment of the present invention. In FIG. 9, SB#1 to SB#4 indicate subbands generated from dividing a whole band into 4 subbands, respectively. Although a whole band is divided into 4 subbands in FIG. 9, this is one example. Alternatively, it is able to divide a whole band into a prescribed number of subbands. Moreover, PMI#1 to PMI#4 in FIG. 9 indicate precoding matrices applied to the above subbands, respectively. Frequency domain symbols obtained after completion of DFT are separated by cluster unit and then allocated in frequency band.

CL#1 and CL#2 indicate clusters of frequency domain symbols obtained after DFT, respectively. Since whole frequency band occupied by the cluster CL#1 is included in the subband SB#1 to which the precoding matrix PMI#2 is applied, the precoding matrix PMI#2 is applicable to the cluster CL#1.

However, one part of the frequency band occupied by the cluster CL#2 is included in the subband SB#3 to which the precoding matrix PMI#4 is applied and another part of the frequency band occupied by the cluster CL#2 is included in the subband SB#4 to which the precoding matrix PMI#3 is applied. Therefore, in this case, which precoding matrix should be applied to the cluster CL#2 becomes a problem.

For solving this problem, it is proposed that a precoding matrix applied to a subband most overlapped with the frequency band occupied by the cluster CL#2 is applied to the cluster CL#2. Therefore, since the subband most overlapped with the frequency band occupied by the cluster CL#2 is the subband SB#4, the precoding matrix PMI#3 applied to the subband SB#4 is applied to the cluster CL#2.

Second Embodiment

Figure 10:
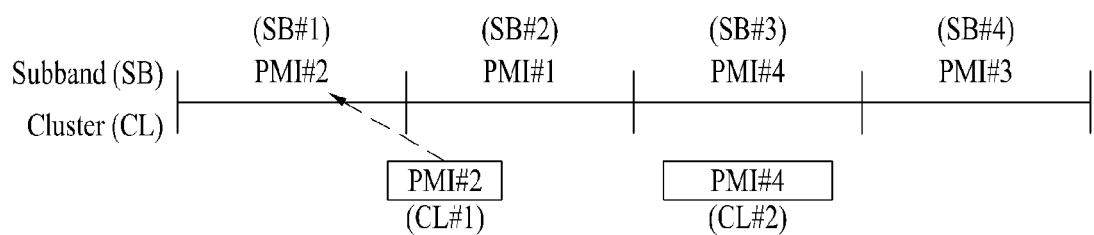
FIG. 10 is a diagram for explaining a method of applying precoding in uplink signal transmission according to one embodiment of the present invention.

FIG. 10 is a diagram for explaining a method of applying precoding in uplink signal transmission according to one embodiment of the present invention. Like the case shown in FIG. 9, frequency domain symbols obtained after completion of DFT are separated by cluster unit and then allocated in frequency band. And, CL#1 and CL#2 indicate clusters of frequency domain symbols obtained after DFT, respectively. Since all of a frequency band occupied by the cluster CL#2 is included in the subband SB#3 to which the precoding matrix PMI#4 is applied, the precoding matrix PMI#4 is applicable to the cluster CL#2.

However, one part of the frequency band occupied by the cluster CL#1 is included in the subband SB#1 to which the precoding matrix PMI#2 is applied and another part of the frequency band occupied by the cluster CL#1 is included in the subband SB#2 to which the precoding matrix PMI#1 is applied. Therefore, in this case, which precoding matrix will be applied to the cluster CL#1 becomes a problem.

For solving this problem, it is proposed that a precoding matrix applied to a subband having a smallest frequency band overlapped with the frequency band occupied by the cluster CL#1 is applied to the cluster CL#1. Therefore, since the subband having the smallest frequency band overlapped with the frequency band occupied by the cluster CL#1 is the subband SB#1, the precoding matrix PMI#2 applied to the subband SB#1 is applied to the cluster CL#1.

Third Embodiment

In the above description, how to apply a precoding matrix to each cluster is explained so far. In the following description, explained is how to transmit the aforesaid information to a user equipment from a base station.

Figure 11:
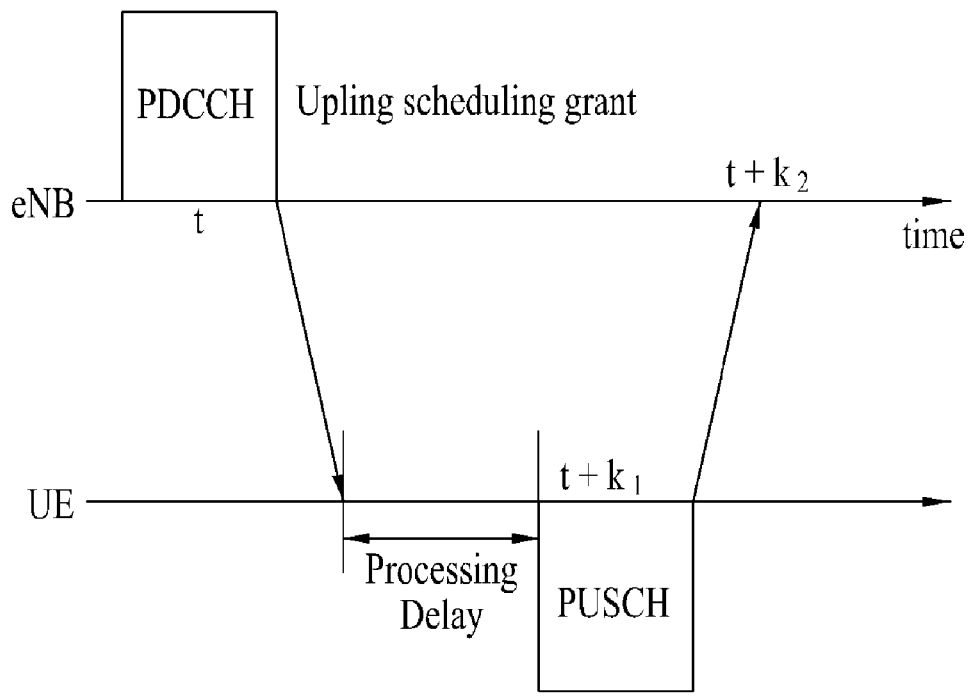
FIG. 11 is a diagram for explaining scheduling of PUSCH (physical uplink shared channel) and PDSCH (physical downlink shared channel) in case of transmitting PDCCH including an UL grant signal in downlink.

FIG. 11 is a diagram for explaining scheduling of PUSCH (Physical Uplink Shared Channel) and PDSCH (Physical Downlink Shared Channel) in case of transmitting PDCCH including an UL grant signal in downlink. Referring to FIG. 11, a user equipment detects a PDCCH including a UL scheduling grant signal in a subframe at a time t and then adjusts a PDSCH transmission in a subframe at a time t+k according to the detected PDCCH.

Figure 12:
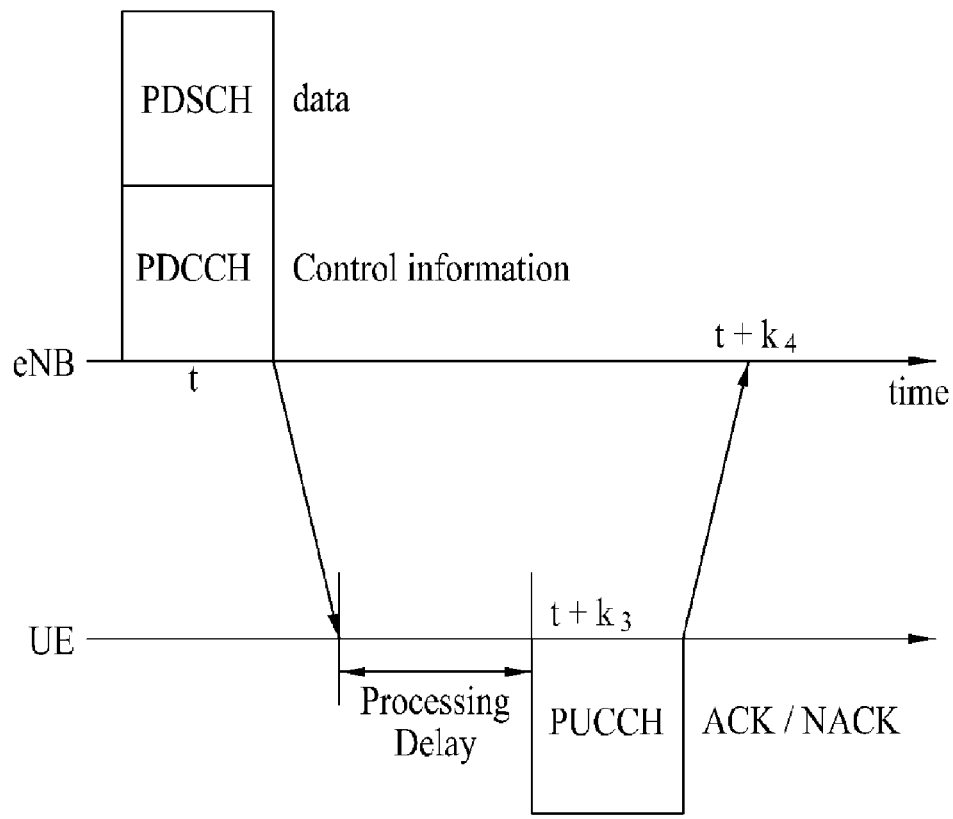
FIG. 12 is a diagram for explaining scheduling of PUCCH in case of transmitting PDCCH including control information and PDSCH including data in downlink.

FIG. 12 is a diagram for explaining scheduling of PUCCH in case of transmitting PDCCH including control information and PDSCH including data in downlink. Referring to FIG. 12, a user equipment receives data and then transmits corresponding ACK/NACK (Acknowledgement/Negative acknowledgement) information via PUCCH (Physical Uplink Control Channel).

Figure 13:
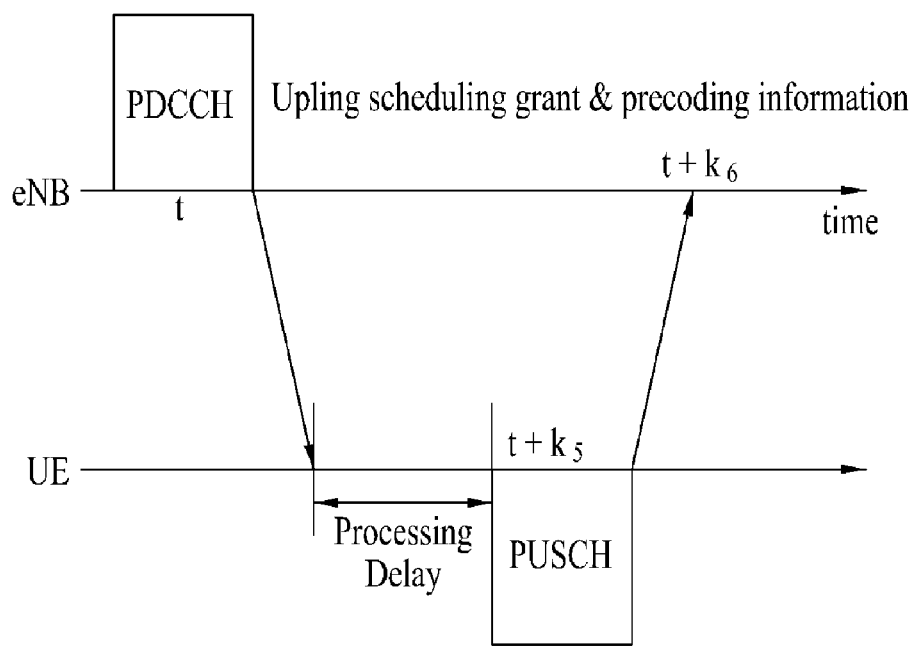
FIG. 13 is a diagram for explaining a method of transmitting PMI information applied to UL signal transmission according to one embodiment of the present invention.

FIG. 13 is a diagram for explaining a method of transmitting PMI information applied to UL signal transmission according to one embodiment of the present invention. Referring to FIG. 13, a base station is able to inform a user equipment of PMI information together with UL scheduling grant information via PDCCH. For instance, when X subbands are used for UL transmission, if a PMI indicating a precoding matrix applied to each of the X subbands is constructed with N bits, a PDCCH needs X*N bits for the precoding that is applied in UL.

Fourth Embodiment

Figure 14:
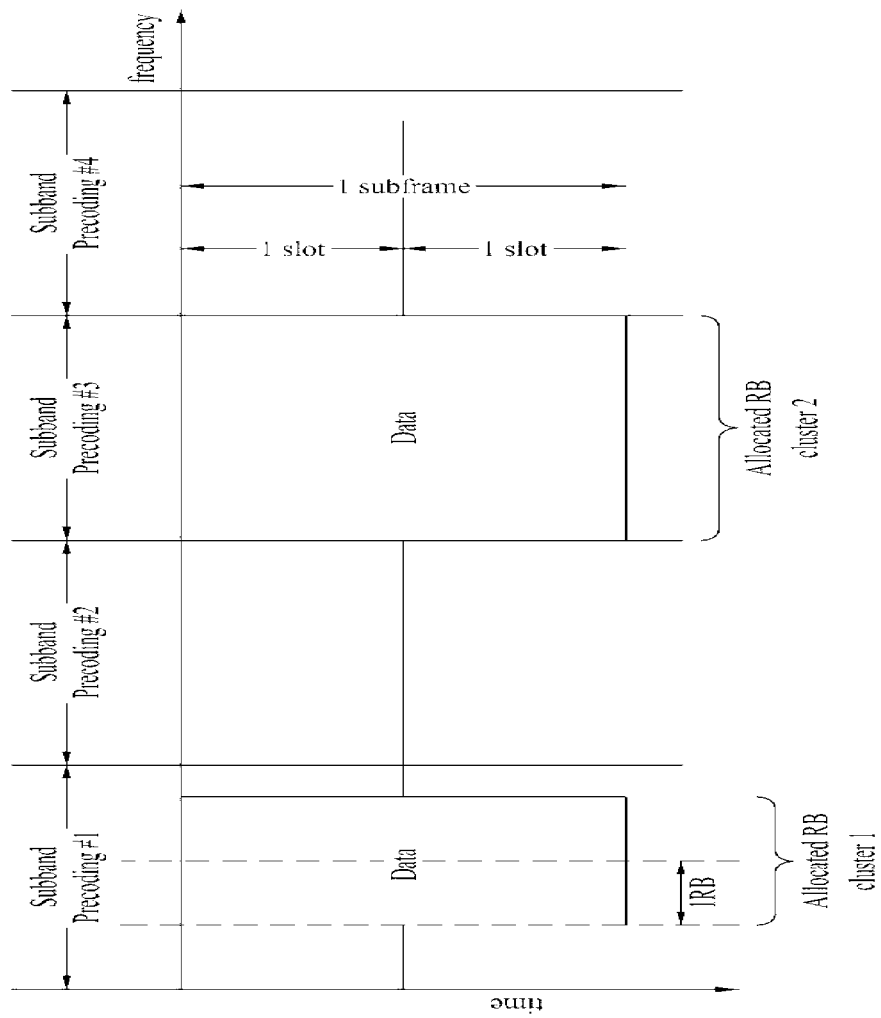
FIG. 14 is a diagram for explaining a method of transmitting PMI information applied to UL signal transmission according to one embodiment of the present invention.

FIG. 14 is a diagram for explaining a method of transmitting PMI information applied to UL signal transmission according to one embodiment of the present invention.

In TDM/FDM (Time Division Multiplexing/Frequency Division Multiplexing) method, PMI information can be separated from a UL scheduling grant signal. In case of indicating the PMI information, a base station is able to indicate at least one or more PMIs. The number of resource blocks (RBs) covered by one PMI can become a whole band or a set RBs smaller than the whole band. In this case, the present embodiment is suitable for applying a precoding matrix per subband in case of multi-cluster UL data transmission. The present embodiment proposes two kinds of the following methods as a method of transmitting PMI information.

According to a first method, PMI information is transmitted by upper layer signaling. For instance, it is able to transmit PMI information to a user equipment by RRC (radio resource control) signaling. Moreover, it is able to insert PMI information in PDSCH. In order to insert PMI in PDSCH, two kinds of schemes can be taken into consideration. According to a first scheme, PMI information is inserted as if it is DL data and encoding and rate matching are then performed in order. In doing so, if it is necessary to transmit real data, the PMI information is added to data and a whole information stream is encoded and rate-matched. According to a second scheme, if it is necessary to transmit data, PMI information is multiplexed with the data. In doing so, each information stream is individually encoded and rate-matched and then multiplexed. The third embodiment relates to a scheme of transmitting PMI via one PDCCH together with another UL scheduling grant signal.

On the contrary, a second method relates to a method of defining a new dedicated DCI for PMI only. For instance, PDCCH including format 0/1/1A/2/2A originally defined for PUSCH or PDSCH is reusable together with padding bit or another control information. In this case, the newly defined DCI for precoding can share a size equal to a previously defined DCI format size.

According to the present embodiment, indication of the precoding on PDSCH or

PDCCH can include multi-transmission rank or multi-subband relevant information.

Fifth Embodiment

First of all, unlike the third or fourth embodiment for carrying PMI information on one physical channel, i.e., either PDCCH or PDSCH, in case that lots of PMI information needs to be transmitted to a user equipment in a PDCCH resource limited situation, some of PMI information (e.g., specific rank) can be carried on PDCCH and the rest of the PMI information can be carried on PDSCH.

Figure 15:
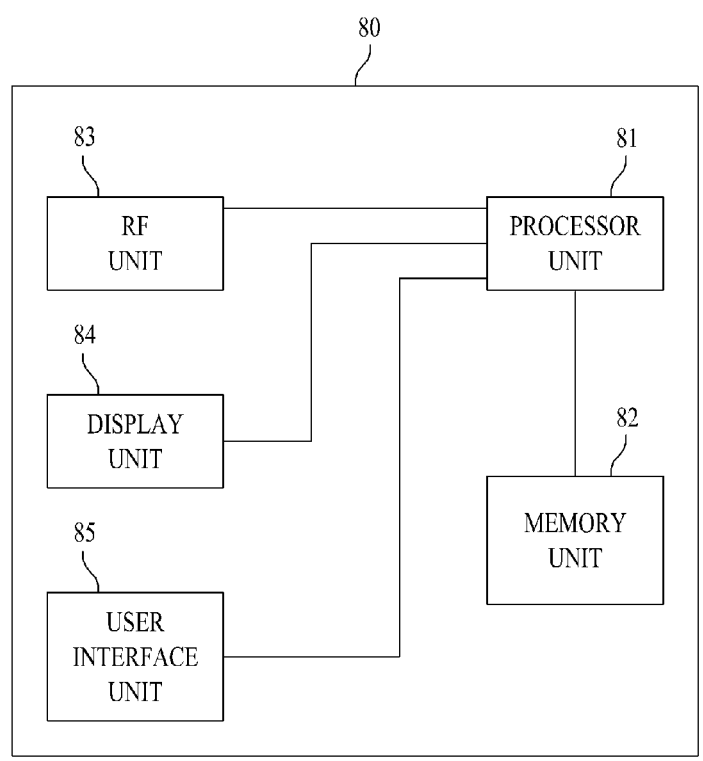
FIG. 15 is a block diagram for a configuration of a device applicable to a user equipment or a base station to implement the above-described method.

FIG. 15 is a block diagram for a configuration of a device applicable to a user equipment or a base station to implement the above-described method.

Referring to FIG. 15, a device 80 includes a processing unit 81, a memory unit 82, an RF (radio frequency) unit 83, a display unit 84 and a user interface unit 85. A layer of a physical interface protocol is performed by the processing unit 81. The processing unit 81 provides a control plane and a user plane. A function of each layer can be performed by the processing unit 81. The memory unit 82 is electrically connected to the processing unit 81. And, an operating system, applications and general files are stored in the memory unit 82. If the device 80 is a user equipment, the display unit 84 is able to display various kinds of informations. And, the display unit 84 can be implemented using a well-known LCD (liquid crystal display), an OLED (organic light emitting diode) display and the like. The user interface unit 85 can be configured by being combined with such a well-known user interface as a keypad, a touchscreen and the like. The RF unit 83 is electrically connected to the processing unit 81. The RF unit 83 transmits or receives a radio signal.

In this disclosure, embodiments of the present invention are described centering on the data transmission/reception relations between a base station and a user equipment. In this case, the base station can include eNB (evolved NodeB) and is meaningful as a terminal node of a network which directly performs communication with a user equipment. In this disclosure, a specific operation explained as performed by a base station can be performed by an upper node of the base station in some cases.

In particular, in a network constructed with a plurality of network nodes including a base station, various operations performed for communication with a user equipment can be performed by the base station or other networks except the base station. In this case, the base station can be replaced by such a terminology as a fixed station, a Node B, an evolved Node B, an access point and the like. And, according to the present invention, user equipment corresponds to a mobile station (MS). And, the mobile station (MS) can be replaced by such a terminology as a subscriber station (SS), a mobile subscriber station (MSS), a mobile terminal and the like.

Moreover, a user equipment of the present invention can include one of PDA (Personal Digital Assistant), cellular phone, PCS (Personal Communication Service) phone, GSM (Global System for Mobile) phone, WCDMA (Wideband CDMA) phone, MBS (Mobile Broadband System) phone and the like.

MODE FOR THE INVENTION

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to various systems requested to transmit data and control signal in uplink as well as the 3GPP LTE type systems.

The invention claimed is:

1. A method of receiving a physical uplink shared channel (PUSCH) signal, the method comprising:

transmitting a first physical downlink control channel (PDCCH) signal including first precoding matrix indicator (PMI) information for a first set of PMIs related to specific rank to a user equipment;

transmitting a physical downlink shared channel (PDSCH) signal including second PMI information for a second set of PMIs to the user equipment, each of the first and second sets of PMIs corresponding to a respective subband of overall subbands;

transmitting a second PDCCH signal including uplink (UL) grant information for the PUSCH to the user equipment; and receiving the PUSCH signal including one or more clusters from the user equipment, each of the one or more clusters being precoded with a precoding matrix corresponding to a respective PMI after a discrete Fourier transform processing at the user equipment, wherein, for a cluster that overlaps with plural subbands, the respective PMI is selected so that an overlapping region in a frequency domain is maximized between a corresponding subband and the cluster.

2. The method of claim 1, wherein the first PMI information is carried using downlink control information (DCI) format of the first PDCCH signal.

3. A method of transmitting a PUSCH (Physical Uplink Shared Channel) signal, the method comprising:

receiving a first physical downlink control channel (PDCCH) signal including first precoding matrix indicator (PMI) information for a first set of PMIs related to specific rank from a base station;

receiving a physical downlink shared channel (PDSCH) signal including second PMI information for a second set of PMIs from the base station, each of the first and second sets of PMIs corresponding to a respective subband of overall subbands;

receiving a second PDCCH signal including uplink (UL) grant information for the PUSCH from the base station; and transmitting the PUSCH signal including one or more clusters to the base station, each of the one or more clusters being precoded with a precoding matrix corresponding to a respective PMI after a discrete Fourier transform processing at the user equipment, wherein, for a cluster that overlaps with two or more subbands, the respective PMI is selected from two or more PMIs corresponding to the two or more subbands, so that an overlapping region in a frequency domain is maximized between a corresponding subband and the cluster.

4. The method of claim 3, wherein the first PMI information is carried using downlink control information (DCI) format of the first PDCCH signal.

* * * * *